(12) United States Patent
Holland et al.

(10) Patent No.: US 8,700,193 B2
(45) Date of Patent: Apr. 15, 2014

(54) AUTOMATED AUDIO CONFORM

(75) Inventors: David Eugene Holland, Granada Hills, CA (US); Morgan Erasmus Holly, Los Angeles, CA (US)

(73) Assignee: Deluxe Media Inc., Burbank, CA (US)

( * ) Notice: Subject to any disclaimer, the term of this patent is extended or adjusted under 35 U.S.C. 154(b) by 1021 days.

(21) Appl. No.: 12/770,666

(22) Filed: Apr. 29, 2010

(65) Prior Publication Data

US 2011/0268424 A1   Nov. 3, 2011

(51) Int. Cl.
*G06F 17/00* (2006.01)
(52) U.S. Cl.
USPC .............................................. 700/94
(58) Field of Classification Search
USPC .............................................. 700/94
See application file for complete search history.

(56) References Cited

U.S. PATENT DOCUMENTS

2007/0247550 A1* 10/2007 Plaunt ........................... 348/515

* cited by examiner

*Primary Examiner* — Joseph Saunders, Jr.
(74) *Attorney, Agent, or Firm* — Fitch, Even, Tabin & Flannery, LLP

(57) ABSTRACT

A guide start location is located in a guide segment of a guide track. The guide segment has a segment length. A part start location of a part corresponding to the guide start location is located. N phase correlations are performed between N successively overlapped part segments of the part from the part start location and the guide segment from the guide start location within a first interval. Each of the N successively overlapped part segments has the segment length. A best match is determined from the N phase correlations using a match threshold. The best match provides a first offset.

19 Claims, 8 Drawing Sheets

AUTOMATED AUDIO CONFORM

TECHNICAL FIELD

The presently disclosed embodiments are directed to the field of multimedia, and more specifically, to audio processing.

BACKGROUND

Television shows and motion picture features are very often dubbed to several different foreign languages. This process involves sending the picture along with the music and effects (M&E) tracks to various audio post production facilities around the world where the foreign language actor's voices are mixed with the M&E to produce the new foreign language tracks for the shows. Often these mixes are done in multiple parts with multiple tracks, such as stereo, Dolby Pro Logic (Lt/Rt), or discrete 5.1 channel sound.

Those new foreign language tracks are then sent back to a post production facility whose job it is to edit the various parts together and time the audio to the picture so that the actual foreign language versions of the show or motion picture can be made.

Existing techniques to conform these files have a number of disadvantages. The most significant disadvantage is that most techniques are manual, requiring an operator to open files and manually slide each of the foreign language tracks around to match them to the guide track. The manual process is tedious, slow, and is prone to errors.

SUMMARY

One disclosed feature of the embodiments is an automatic technique to automate a matching operation to obtain an offset between a part track and a guide track. A guide start location is located in a guide segment of a guide track. The guide segment has a segment length. A part start location of a part corresponding to the guide start location is located. N phase correlations are performed between N successively overlapped part segments of the part from the part start location and the guide segment from the guide start location within a first interval. Each of the N successively overlapped part segments has the segment length. A best match is determined from the N phase correlations using a match threshold. The best match provides a first offset.

BRIEF DESCRIPTION OF THE DRAWINGS

Embodiments may best be understood by referring to the following description and accompanying drawings that are used to illustrate embodiments of the invention. In the drawings.

DETAILED DESCRIPTION

Figure 1:
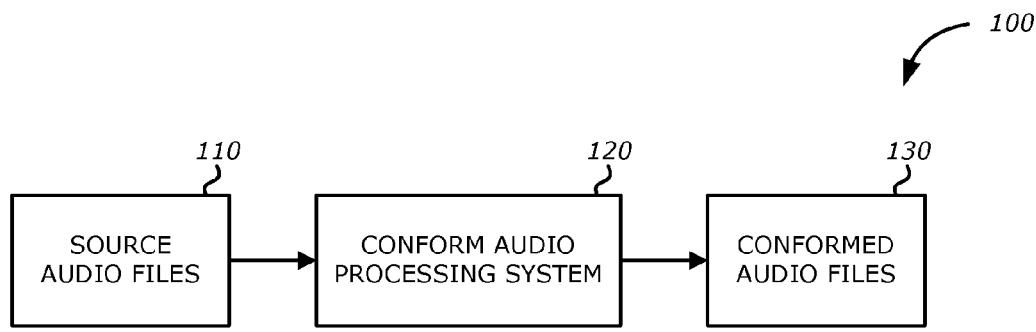
FIG. 1 is a diagram illustrating system according to one embodiment.

One disclosed feature of the embodiments is an automatic technique to automate a matching operation to obtain an offset between a part track and a guide track. A guide start location is located in a guide segment of a guide track. The guide segment has a segment length. A part start location of a part corresponding to the guide start location is located. N phase correlations are performed between N successively overlapped part segments of the part from the part start location and the guide segment from the guide start location within a first interval. Each of the N successively overlapped part segments has the segment length. A best match is determined from the N phase correlations using a match threshold. The best match provides a first offset.

In the following description, numerous specific details are set forth. However, it is understood that embodiments of the invention may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

The technique may be implemented as a computer-implemented procedure or program. An operator starts the procedure and instructs the program where to find the guide track as well as each of the foreign language files. For example, the operator would select where to find the file for Part 1 left, Part 2 left, Part 3 left, Part 1 right, Part 2 right, Part 3 right, and so on for each of the remaining channels, if any. The operator also enters the path and filename for each of the resulting conformed files that will be created. Now the software has everything it needs to proceed and the operator simply directs the software to proceed with the conform process. From here on out it is totally automatic and continues until it has finished writing the required conformed files. When finished the conformed files are now single parts having identical length as the guide and in time with the guide. Since each of the channels for a given part are in time with one another, it is only necessary to match one of the channels to the guide track. Once the timing measurements have been completed for one channel, those measurements can be used to time all the channels to the guide. If there is overlap between one part and the next, that overlap timing relationship can also be used when editing one part to the next. If there is no overlap then the later parts will have to be matched to the guide as was done with the first part Often the guide track is different from the part that is being matched to it, in that the waveforms are quite different. They sound similar, but the actual waveforms look quite different. One example is where an English LtRt is used as the guide but is matching 5.1 channel Spanish tracks to it.

Certainly some of the frequency components in the Lt English and the Left Spanish channel match each other but a lot also does not match. The matching of these channels may be performed by a phase correlation. One of the advantages of using phase correlation is that it can give a value as to how close a match has been achieved. Another advantage is that the comparison calculation does not require the two sections that are being compared, to be exactly in time with one another. This is because the phase correlation technique not only produces a value indicating how close a match has been achieved but it also produces a value indicating how many samples they are out of time with one another. This means that the matching algorithm can search for a match a block at a time rather than a sample at a time.

The phase correlation requires performing a Fourier Transform on a section of the audio data. The fastest way to perform a Fourier Transform is by using the Fast Fourier Transform algorithm or FFT. The FFT algorithm requires that the number of data points be a power of 2. In one embodiment, the number of data points used for the phase correlation is 32,768. At a sampling rate of 48000 times per second, this represents about 0.68 seconds. Other samples sizes may also be used.

FIG. 1 is a diagram illustrating system 100 according to one embodiment. The system 100 includes source audio files 110, a conform audio processing system 120, and conform audio files 130.

The source audio files 110 may include various audio files that need to be matched, correlated, or conformed. In one embodiment, these files may be foreign language tracks associated with a movie picture. They may be BWAV computer files. They may have extra time added to the beginning and end of each part. Each part may start with 30 to 60 seconds of tone, followed by silence and finally the actual audio for the picture. At the very end there may be another 30 to 60 seconds of silence added. For example, a typical set of BWAV files may have three parts and a separate file for each channel of 5.1 audio. In this case there may be six files for each part for a total of eighteen BWAV files.

The conform audio processing system 120 may be a system to create conform audio files. It may perform matching or correlation of waveforms representing signals. The signals may be audio signals. The system 120 may be a software system, a hardware system, or a combination of both.

The conform audio files 130 are the file or files that are conformed. They may include single part audio file for each channel of audio that matches or synchronizes with the guide track in length and is timed to the motion picture.

Figure 2:
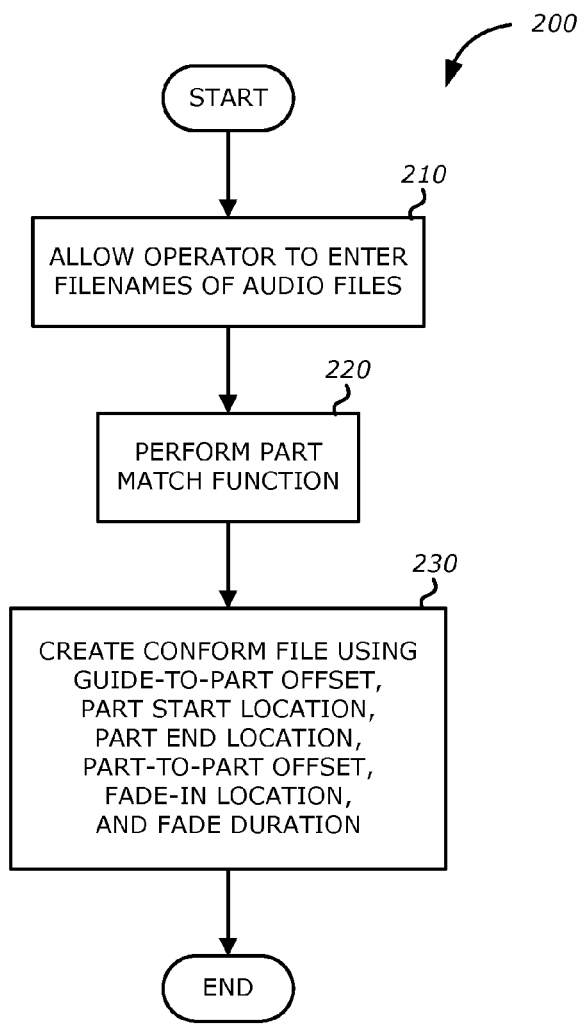
FIG. 2 is a diagram illustrating a process to conform audio files according to one embodiment.

FIG. 2 is a diagram illustrating a process 200 to conform audio files according to one embodiment. The process 200 illustrates the operations or sequence of operations that correspond to the conform audio processing system 120.

Upon START, the process 200 allows the operator to enter the filenames of the audio files in the source audio files 110 and the filenames of the conform audio files 130 (Block 210). These filenames may be used to retrieve the appropriate audio files during the conform audio processing. Next, the process 200 performs the part matching function (Block 220). The part matching function may include operations to match a part track with the guide track, a part track with the next part track, etc. The result of the part match function includes the generation of the various parameters that may be used in the creation of the conform file. These parameters may include a guide-to-part offset, a part start location, a part end location, a part-to-part offset, a fade-in location, and a fade duration. The part-to-part offset, the fade-in location, and the fade duration may be generated when there are more than one part. If there is only one part, it may be sufficient to have only the guide-to-part offset, the part start location, and the part end location.

Then, the process 200 creates a conform file using the guide-to-part offset, the part start location, the part end location, the part-to-part offset, the fade-in location, and the fade duration. The process 200 is then terminated.

Figure 3:
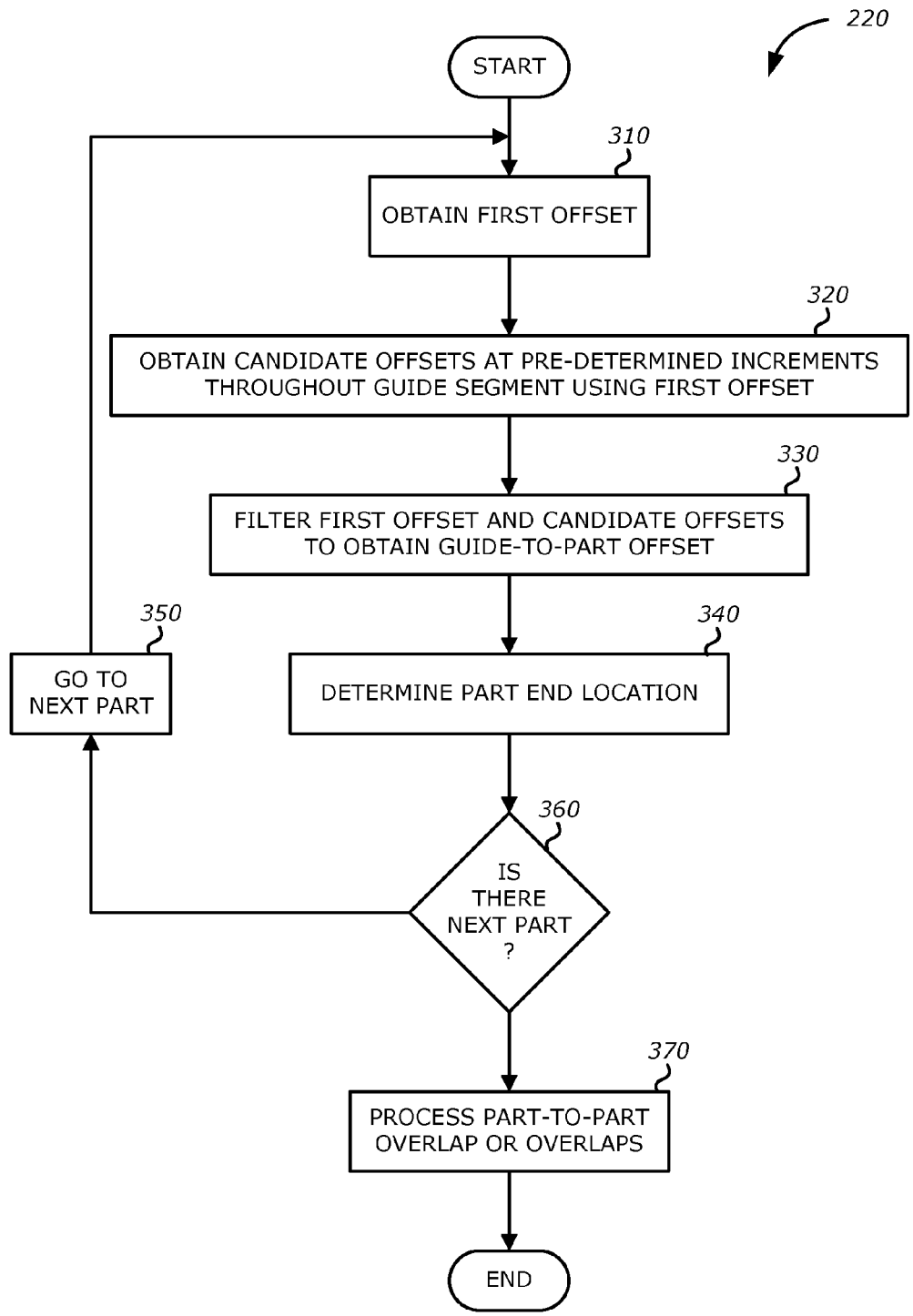
FIG. 3 is a diagram illustrating a process to perform part match function according to one embodiment.

FIG. 3 is a diagram illustrating the process 220 shown in FIG. 2 to perform part match function according to one embodiment.

Upon START, the process 220 obtains a first offset from the part to the guide track (Block 310). Next, the process 220 obtains candidate offsets at pre-determined increments throughout the guide segment using the first offset (Block 320). For efficiency, the increments are typically of equal length, but variable length may be possible as long it is kept consistent. The pre-determined increments may include increments of a pre-determined time interval or number of samples. The value of the pre-determined time interval or number of samples may depend on the type of audio files. In one embodiment, this value may range from a few seconds to several hundred seconds. For typical motion picture audio files, this value may be approximately 20 seconds.

Then, the process 220 filters the first offset and the candidate offsets to obtain a guide-to-part offset (Block 330). The objective of the filtering process is to obtain a reliable and accurate value of the offset between the part track and the guide track. Next, the process 220 determines the part end location (Block 340). The part end location may be expressed as a sample number or an index to a time value. It is a value that indicates the end of the part being matched with the guide track.

Then, the process 220 determines if there is a next part (Block 360). If so, the process 220 goes to the next part (Block 350) and returns to block 310 to process this next part. If there is no next part, the process 220 processes the part-to-part overlap (Block 370). If there is only one part, then this block may be skipped. If there are more than two parts, block 370 is executed for each part-to-part overlap. The process 220 is then terminated.

Figure 4:
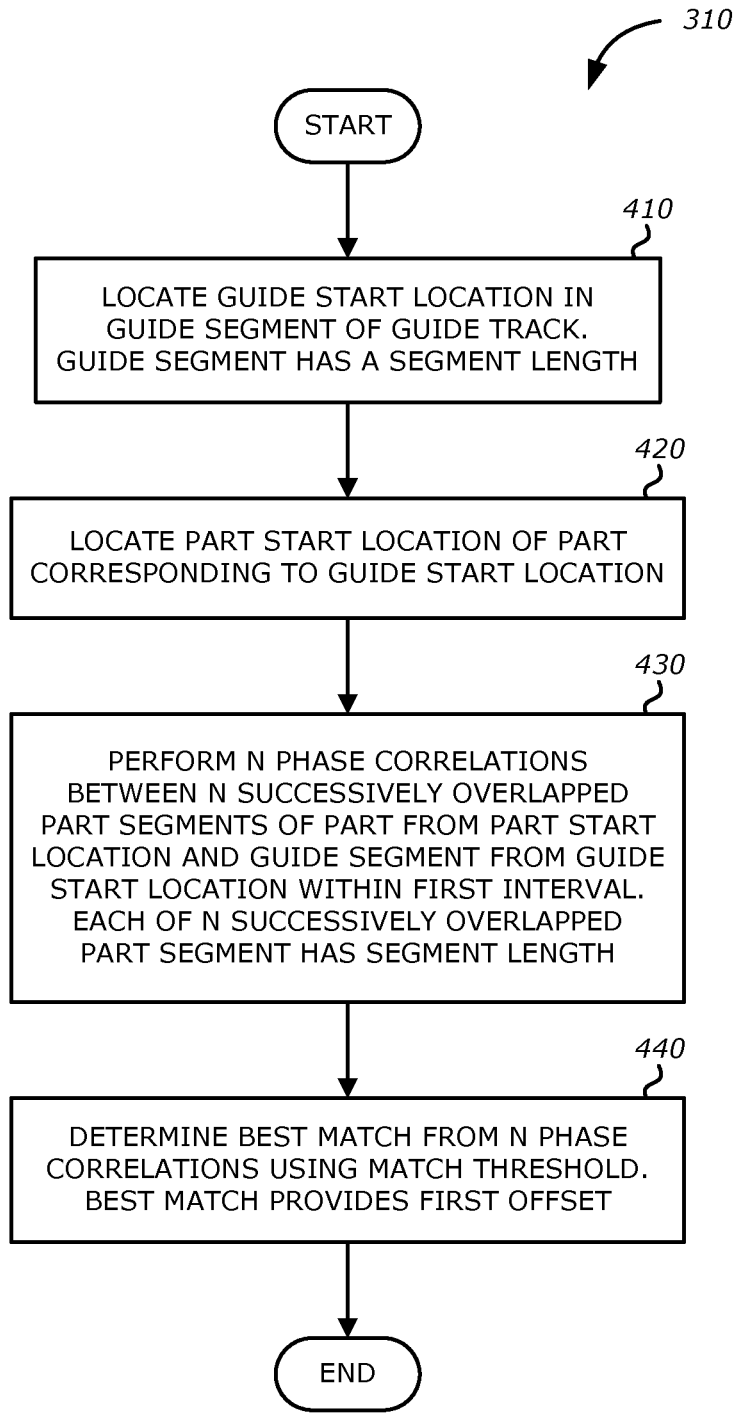
FIG. 4 is a diagram illustrating a process to obtain a first offset according to one embodiment.

FIG. 4 is a diagram illustrating the process 310 shown in FIG. 3 to obtain a first offset according to one embodiment.

Upon START, the process 310 locates a guide start location in a guide segment of a guide track (Block 410). The guide segment has a segment length. The guide start location may be a sample number or an index pointing to the start of the guide segment that is used for matching purposes. This is to start at some reasonably loud audio so as to skip trying to match the silence or any low level audio at the beginning of the guide track. The first interval may be selected according to the length of the guide track or some known reasonable length for a reliable search and matching. In one embodiment, this length may correspond to 60 seconds to 240 seconds. The length may be specified in terms of the number of samples. For example, if the audio signal is sampled at 48 KHz, then 48,000 samples corresponds to one second.

Then, the process 310 locates a part start location of a part corresponding to the guide start location (Block 420). The part start location is the start location of the part track for the matching. Next, the process 310 performs N phase correlations between N successively overlapped part segments of the part from the part start location and the guide segment from the guide start location within a first interval. Each of the N successively overlapped part segments has the segment length.

The value N is an integer and depends on the segment length, the overlap amount, and the value of the first interval. Typically, the segment length, when expressed as the number of samples, is equal to $L=2^K$ where L is the size of the Fast Fourier Transform (FFT) that is used for matching using phase correlation. The overlap amount refers to the amount that the successive segments are overlapped. For example, suppose the sampling rate is 48 KHz. If the segment length is 32K which corresponds to 0.68 second, the overlap amount is half of the segment length, and the first interval is 120 seconds, then N=first interval/overlap amount=120 sec./0.34 sec.=353.

Then, the process 310 determines a best match from the N phase correlations using a match threshold (Block 440). The best match provides a first offset. The best match is the match which produces the highest correlation which exceeds the match threshold. The match threshold is a value that is determined based on the signal strength and quality. The relative location of the track segment that gives the best match to the guide segment plus the measured phase correlation offset within that segment is the first offset. If the best match does not exceed the match threshold, then the process may go through a reset operation. In this reset operation, the part file pointer may go back to the point where it started searching and then both the guide and part pointers are advanced by some amount, perhaps 20 seconds for example and the process starts over trying to find a match. Alternatively, after this advance the process may also begin looking in the guide for some audio that exceeds a certain level in order to avoid matching low level audio. In this case if the guide pointer is advanced, the part pointer also should be advanced by the same amount to avoid any unnecessary searching of the part file where the matching guide samples will not be found. This reset process may repeat multiple times if necessary to find a match value that exceeds the required threshold. A reset repeat limit is set to perhaps a dozen or so tries before giving up entirely.

After obtaining the first offset, the process 310 is terminated.

Figure 5:
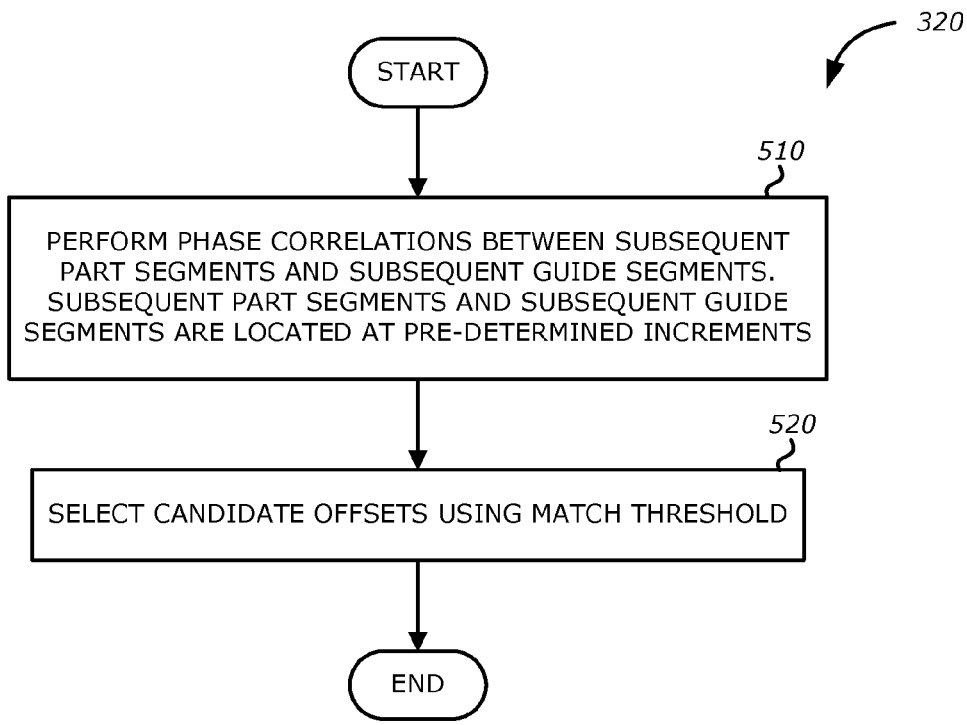
FIG. 5 is a diagram illustrating a process to obtain candidate offsets according to one embodiment.

FIG. 5 is a diagram illustrating the process 320 shown in FIG. 3 to obtain candidate offsets according to one embodiment.

Upon START, the process 320 performs phase correlations between subsequent part segments and subsequent guide segments (Block 510). The subsequent part segments and subsequent guide segments are located at the pre-determined increments. In other words, after the first offset is obtained, the operation searches throughout the guide and the part for the remaining matches. This may be done by advancing an increment at a time through the guide while using the previously calculated offset to locate the corresponding samples in the part. In one embodiment, the increment may be a few seconds to a hundred seconds.

Next, the process 320 selects the candidate offsets using the match threshold (Block 520). A match is achieved if the match result (i.e., the correlation value returned by the phase correlation) exceeds the match threshold. When a match is achieved, the match value is saved along with a new calculated offset value in a table of results. If the match value is poor (e.g., less than the match threshold), those results are discarded and the test proceeds to the next location, in this case another increment later in the guide and the part files. The process 320 is then terminated.

Figure 6:
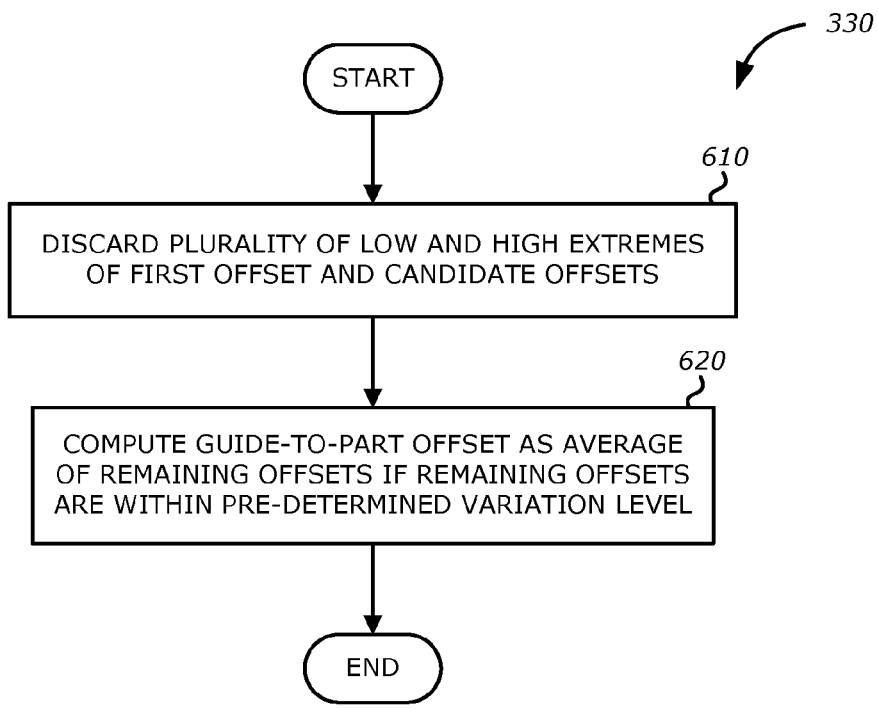
FIG. 6 is a diagram illustrating a process to filter first offset and candidate offsets according to one embodiment.

FIG. 6 is a diagram illustrating the process 330 shown in FIG. 3 to filter first offset and candidate offsets according to one embodiment.

Upon START, the process 330 discards a plurality of low and high extremes of the first offset and the candidate offsets (Block 610). For example, the process 330 may discard the highest ⅛ and the lowest ⅛ of the offsets, and keep 75% of the offsets in the middle. Next, the process 330 computes the guide-to-part offset as average of remaining offsets if the remaining offsets are within a pre-determined variation level (Block 620). One way to do this is to obtain the difference of the highest value of the remaining offsets and the lowest value of the remaining offsets. This difference is then compared to a limiting value, for example 4000 or 6000 samples depending on the amount of variation that can be tolerated. If this difference is less than this limiting value, the remaining offset values are averaged together to produce the guide-to-part offset which is the offset value that will actually be used to produce the output files. If this difference is greater than the limiting value, a reset operation may be performed.

Figure 7:
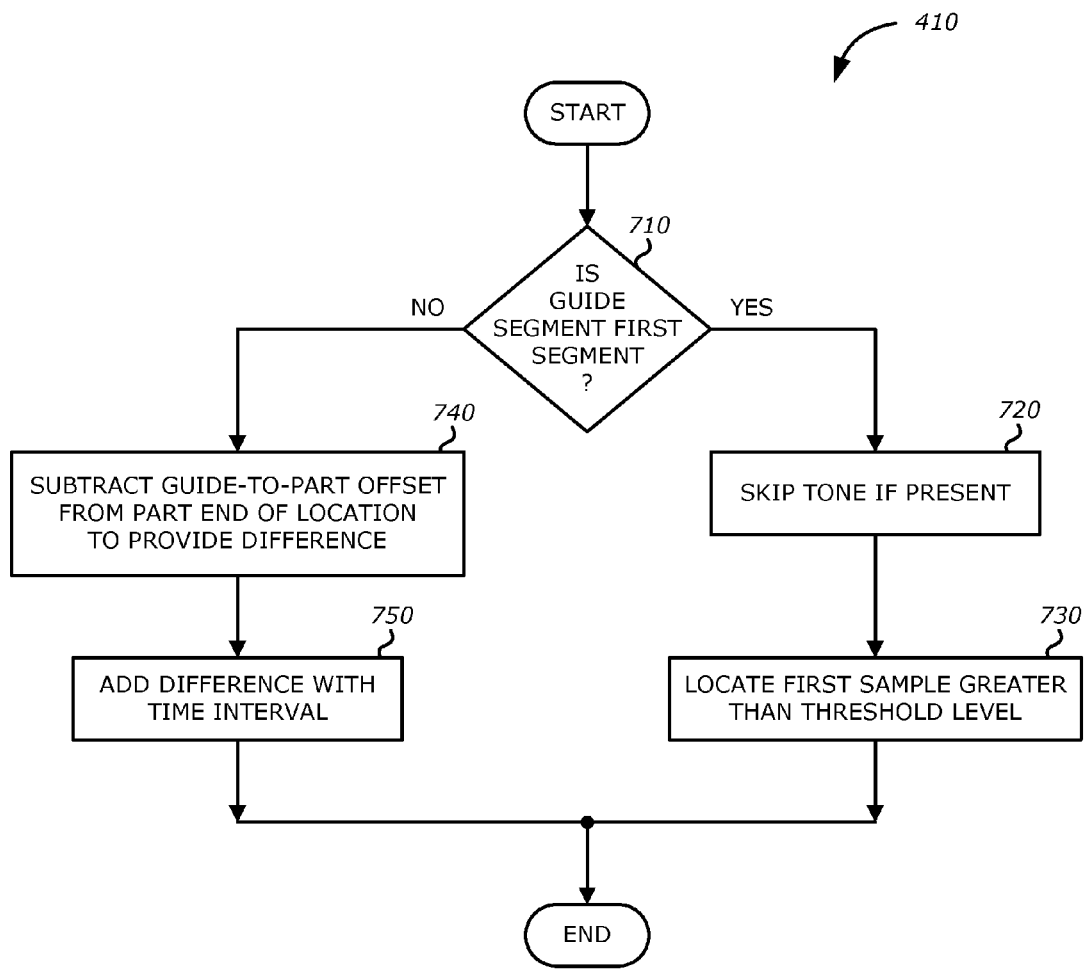
FIG. 7 is a diagram illustrating a process to locate a guide start location according to one embodiment.

FIG. 7 is a diagram illustrating the process 410 shown in FIG. 4 to locate a guide start location according to one embodiment.

Upon START, the process 410 determines the guide segment is the first segment (Block 710). If the guide segment is a first segment, the process 410 skips a tone if present (Block 720). A tone is typically a signal at frequency between 750 Hz to 1 KHz. Then, the process 410 locates a first sample greater than a threshold level (Block 730). This is to search for a low level of audio above a threshold (e.g., −30 dB) to skip over any silence interval. The process 410 is then terminated.

If the guide segment is a subsequent segment, the process 410 subtracts the guide-to-part offset from the part end of location to provide a difference (Block 740). Then, the process 410 adds the difference with a time interval (Block 750). In one embodiment, this time interval may be selected as 5 seconds. The process 410 is then terminated.

Figure 8:
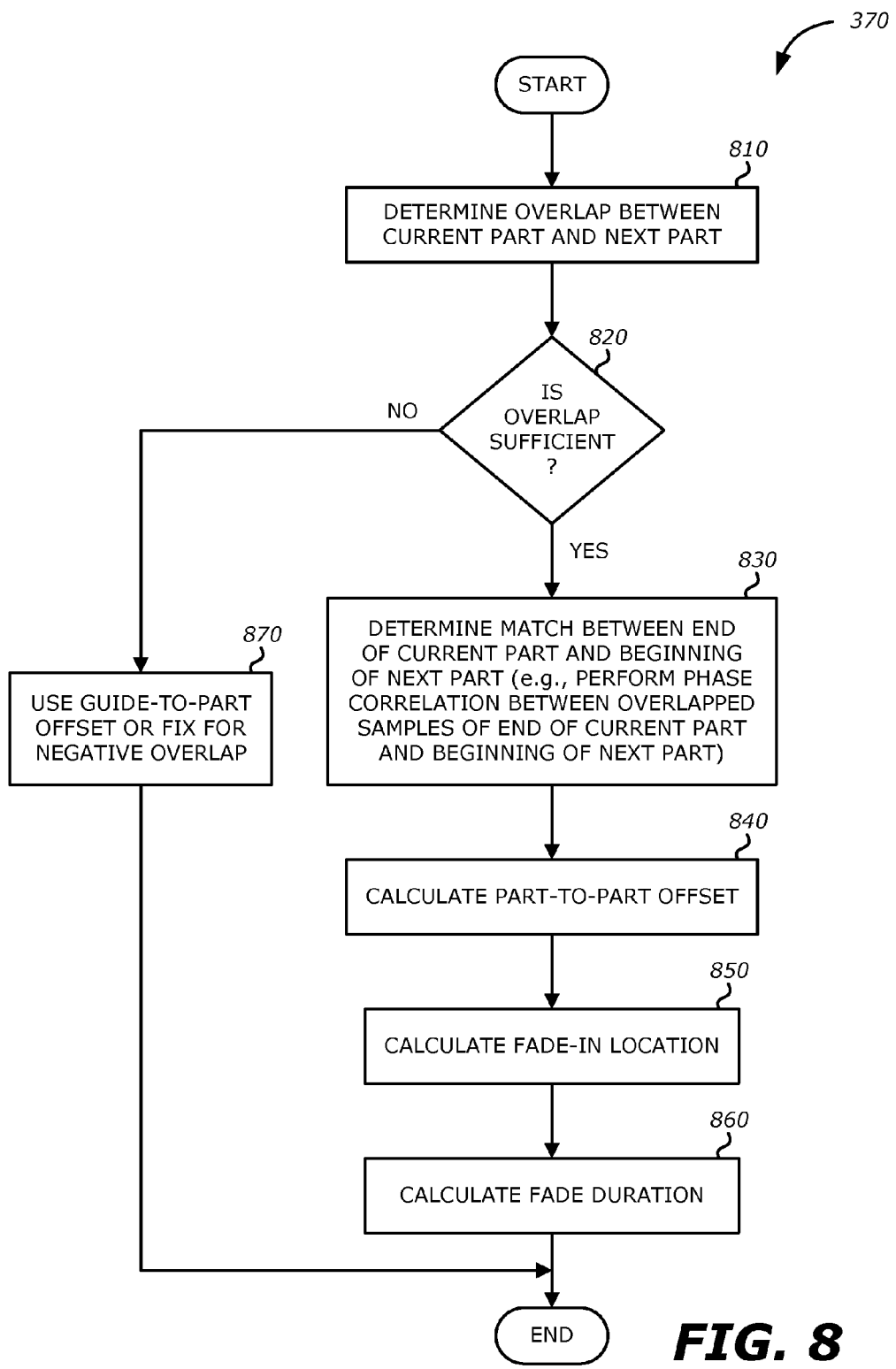
FIG. 8 is a diagram illustrating a process to process part-to-part overlap according to one embodiment.

FIG. 8 is a diagram illustrating the process 370 shown in FIG. 3 to process part-to-part overlap according to one embodiment. This process 370 is performed when there are more than one part.

Upon START, the process 370 determines an overlap between a current part and a next part (Block 810). Next, the process 370 determines if the overlap is sufficient (Block 820). This can be performed by comparing the amount of overlap with some pre-determined threshold value. In one embodiment, this pre-determined threshold value is 8,000 samples. If the overlap is sufficient, the process 370 determines a match between end of the current part and beginning of the next part (Block 830). This may be performed by performing a phase correlation between the overlapped samples of the end of the current part and the beginning of the next part. The phase correlation may be performed with a suitable FFT size. For example, a sample size of 1024 may be taken starting 8000 sample back from the end of the first part to search for a match to these samples in the next part. If it fails to find a match, the next 1024 samples from the first part are used and the search is repeated. This process may repeat up to 8 times if necessary.

Then, the process 370 calculates a part-to-part offset (Block 840) using the offset provided by the match in the overlapped samples. Next, the process 370 calculates a fade-in location (Block 850). Then, the process 370 calculates a fade duration (Block 860) and is then terminated.

If the overlap is not sufficient, the process 370 uses the guide-to-part offset or fixes for negative overlap (Block 870). If the overlap between parts is negative, indicating no overlap, the fix may be performed by dropping the audio detection thresholds to −66 db and re-searching for the end of the previous part and the start of the next part and then recalculate the overlap. This often results in a positive overlap because very low level audio is now included in the length. These low thresholds are not originally used because sometimes there is low level audio that should not be included and that would give an inaccurate location for the beginning and ends of the parts. The process 370 is then terminated.

Figure 9:
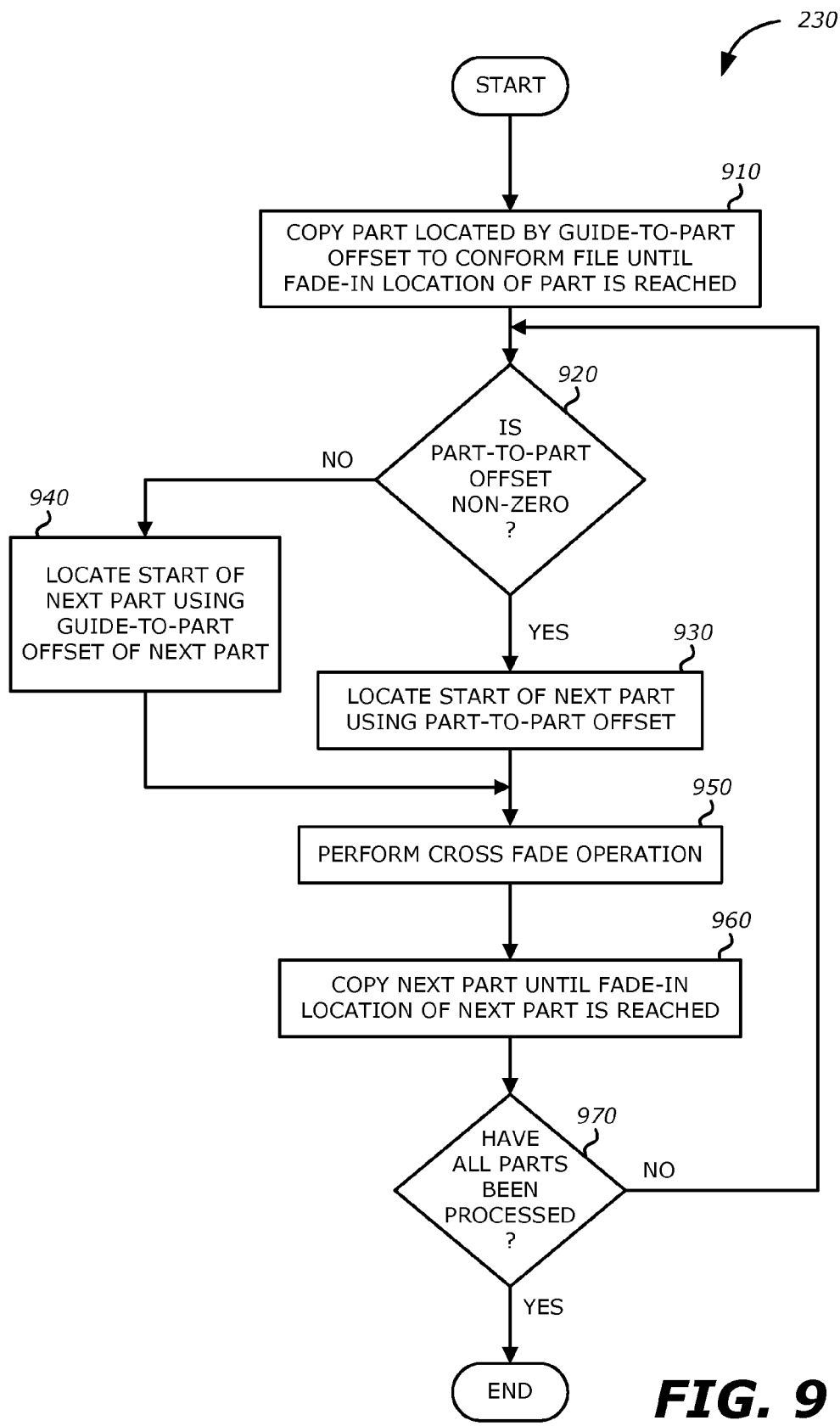
FIG. 9 is a diagram illustrating a process to create conform file according to one embodiment.

FIG. 9 is a diagram illustrating the process 230 shown in FIG. 2 to create conform file according to one embodiment.

Upon START, the process 230 copies the part located by the guide-to-part offset to the conform file until the fade-in location of the part is reached (Block 910). Next, the process 230 determines if the part-to-part offset is non-zero (Block 920). If so, the process 230 locates start of the next part using the part-to-part offset (Block 930) and then proceeds to Block 950. Otherwise, the process 230 locates start of the next part using the guide-to-part offset of the next part (Block 940).

Then, the process 230 performs a cross fade operation (Block 950). Next, the process 230 copies the next part until the fade-in location of the next part is reached (Block 960). Then, the process 230 determines if all parts have been processed (Block 970). If not, the process 230 returns to Block 920 to continue. Otherwise, the process 230 is terminated.

It is understood the above operations may be repeated as necessary to process all the parts.

The following are the pseudo codes illustrating the above operations. It is noted that specific numerical values (e.g., 32768) are used only for illustrative purposes.

```
// Process( ) is given two wav files and pointers to the start of a SampDur long sample section
// in each file that it will compare using phase correlation. It will return an phase value
// (MeasuredOffset) indicating how many samples they are out of time. And, it also returns a
// value indicating the quality of the match (RatioMaxToAverage).
// If this quality figure is low then the measured offset is meaningless.
// For Guide to Part matching, SampDur = 32768, and SampDurPwr = 15 where 2^15 = 32768.
// For Part to Part matching, SampDur = 1024, and SampDurPwr = 10 where 2^10 = 1024.
// Window is a pre-computed array with SampDur values. Window is discussed below.
Process( Wav1, Wav1SampleNumber, Wav2, Wav2SampleNumber, SampDur, SampDurPwr,
                           Window, Return MeasuredOffset, Return RatioMaxToAverage)
{
           // Get SampDur samples from Wav1 starting at the sample given by Wav1SampleNumber
           // and place them in Wav1DataArray which is double floating point so the audio integers
           // sample values are converted. The function ExtractSamplesToArray( ) is straight forward
           // so we won't cover its internal workings.
                  If( ExtractSamplesToArray(Wav1, Wav1SampleNumber, Return Wav1DataArray) )
                  {                    // Failed to get audio samples.
                               Return true     // Exit Process indicating failure, probably just the end of the //
                                               // Wav1 file.
                  }
           // Do the same for Wav2.
           If(ExtractSamplesToArray(Wav2, Wav2SampleNumber, Return Wav2DataArray) )
                  {                    // Failed to get audio samples
                               Return true     // Exit Process indicating failure, probably just the end of the
                                               // Wav2 file.
                  }
           // Now the values in these two data arrays will be phase correlated.
           // The first step is to apply a window function to the data in each array.
           // The window function we have used is a modified Hann window which is normally
           // just a raised Cosine function, but we changed it so that the first quarter of the window
           // is the raised cosine function going from 0 to 1. The section from ¼ to ¾ through
           // the window has a value of 1.0, and the final quarter is the raised cosine function going
           // back from 1 to 0.
           // Other windows can be used but we wanted the central section to have good level
           // for the comparison.
           // The above described window function is pre-computed and resides in the array
           // called Window.
           // Apply window function to the data by multiplying the Window[ ] arrays with the
           // Wav1DataArray[ ] and Wave2DataArray[ ] element-by-element.
           // The imaginary components of these arrays may be filled up with zeros.
           // Compute the forward FFT (Fast Fourier Transform) of the Wav1 Data using
           // a standard FFT subroutine.
           FFT( 1, SampDurPwr, Wav1DataArray, Wav1DataArrayIm )
           // 1 means forward FFT, SampDurPwr means 2^SampDurPwr samples = SampDur.
           // Wav1DataArray and Wav1DataArrayIm are now replaced with the spectrum of
           // the original data.
           // Do the same for the Wav2 Data.
           FFT( 1, SampDurPwr, Wav2DataArray, Wav2DataArrayIm )
           // Wav2DataArray and Wav2DataArrayIm now contain the spectrum of the original data.
           // Calculate the Cross-Power Spectrum for each point.
                       // First compute the product of the Wav1 spectrum and
                       // the complex conjugate of the Wav2 Spectrum to generate real and imaginary
                       // parts Pr and Pi
                       // Divide these results by their absolute value.
                       // Compute the absolute value by taking square root of the sum of the squares.
                       // Then, divide Pr and Pi by the absolute value.
           // DataArrayReal[ ] and DataArrayImag[ ] contain the real and imaginary parts,
           // respectively, of the Cross-Power Spectrum.
           // Now we obtain the Normalize Cross-Correlation by computing the inverse FFT.
           FFT( -1, SampDurPwr, DataArrayReal, DataArrayImag )
           // -1 means inverse FFT, SampDurPwr means 2^SampDurPwr samples = SampDur.
           // The DataArrayReal now contains the phase correlation result.
```

```
            // The values in DataArrayImag will be very close to zero at this point.
            // The next step is to locate the position (imax) and value of the sample with the maximum
            // absolute value (MaxValue) and also compute the average of all the values.
            If( imax > (SampDur / 2 ) )
            {              // The peak is in the second half of the array which means the offset is negative.
                    imax = imax − SampDur              // Compute the negative offset.
            }
            MeasuredOffset = imax                      // Return the measured sample offset.
            RatioMaxToAverage = MaxValue / ( Sum / SampDur ) // Return the match quality.
            Return false // Exiting Process with a possible match.
}
// The function, SearchForWav1ToWav2Match( ), is given a Wav1 wav file and sample number,
// Wav1SearchStart, along with the Wav2 wav file and sample number, Wav2SearchStart.
// If bPartToPart is false, this means Wav1 is a Guide file and Wav2 is a Part file and it uses the
// 32768 samples in Wav1 starting at sample number Wav1SearchStart and searches the Wav2
// file starting at sample Wav2SearchStart, proceeding up to 120 seconds into the Wav2 wav
// looking for a good match using a phase correlation method that rates the quality of the matches
// found. The function returns a value, Wav1ToWav2Offset, which is a measure of the sample
// offset between the Wav1 file and the Wav2 file. It exits with a return value of true for failure and
// false for success.
// If bPartToPart is true, this means that it will be comparing the end of a Part file to the beginning
// of the next Part file, where the end of the audio in Wav1 will be searched for in the beginning of
// Wav2. In this case 1024 samples near the end of Wav1 will be searched for near the beginning
// of Wav2. Also if it succeeds finding a match then it also exits with a value StartFadeToNext
// which indicates where in Wav1 the fade to Wav2 should begin.
SearchForWav1ToWav2Match( Wav1, Wav1SearchStart, Wav2, Wav2SearchStart, bPartToPart,
                , Window, Return Wav1ToWav2Offset, Return StartFadeToNext )
{
            If( bPartToPart)
            {    // Set up for searching the next Part file for a match to the end of the previous Part file.
                    SampleDuration = 1024         // The number of samples used for phase correlation.
                    SampDurPwr = 10               // $2^{10}$ =1024. Used later by FFT.
                    SearchDuration = 60 * 48000   // Search into following Part (Wav2) up to 60 seconds.
                    CheckIncrement = 1024         // Then check every 1024 samples after first match
                    MaxResetCount = 0             // No Resets allowed.
                    ListSize = 8
            }
            Else
            {
                    // Set up for searching a Part file (Wav2) for a match to the Guide samples in Wav1.
                    SampleDuration = 32768        // Number of samples used for phase correlation.
                    SampDurPwr = 15               // $2^{15}$ = 32768. Used later by FFT.
                    SearchDuration = 120 * 48000  // Search into Part (Wav2) up to 120 seconds.
                    CheckIncrement = 20 * 48000   // Then check every 20 seconds after first match.
                    MaxResetCount = 14            // Number of Resets allowed.
                    ListSize = 120
            }
            Wav2Increment = SampleDuration / 2
            MaxThreshold = 20.0           // This is the threshold that must be exceeded signaling
                                          // a good match.
            Wav1Sample = Wav1SearchStart
            Wav2Sample = Wav2SearchStart
            CurrentWav2Sample = Wav2Sample
            MaxWav2Sample = Wav2Sample + SearchDuration
            ResetCount = 0
            If(false) // This code is only entered by a goto Reset.
            {
Reset:ResetCount = ResetCount + 1
                            If( ResetCount > MaxResetCount ) return true // Exit signaling failure
                            Wav1Sample = Wav1Sample + CheckIncrement
                            Wav2Sample = Wav2Sample + CheckIncrement
                            CurrentWav2Sample = Wav2Sample
                            MaxWav2Sample = Wav2Sample + SearchDuration
            }
            Finished = false // Finished is set true if an end of file is reached.
            MaxRatio = 0.0                // Initialize MaxRatio which will be the ratio of the peak phase correlation
                                          // value
                                          // to the average value. This gives a measure of the quality of the match
                                          // reading.
            While(CurrentWav2Sample < MaxWav2Sample)
            {             // Process( ) returns the measured offset and a match quality measurement.
                          // If the match quality is poor then the measured offset is meaningless.
                          If( Process( Wav1, Wav1Sample, Wav2, CurrentWav2Sample, SampleDuration,
                                  SampDurPwr,
                                  Window, Return MeasuredOffset, Return RatioMaxToAverage ) )
                          {     // Failed to compare
                                Return true // Exit signaling failure
                          }
                          If( RatioMaxToAverage > MaxRatio )
                          {     // This match is better than previous ones.
```

```
                              MaxRatio = RatioMaxToAverage // Save the better reading.
                              FoundWav2Sample = CurrentWav2Sample – MeasuredOffset
                              FoundOffset = FoundWav2Sample – Wav1Sample
                       }
                       // Advance to next position.
                       CurrentWav2Sample = CurrentWav2Sample + Wav2Increment
                       // If there is an excellent match, stop search by exiting the While loop.
                       If( MaxRatio > 100.0 ) break;
        }
        If( MaxRatio < MaxThreshold ) goto Reset // Reset and try again if match so far is poor.
        // A possible first match has been found.
        i = 0
        // Save in a list the values from the first good measurement.
        List[i].MaxRatio = MaxRatio
        List[i].Wav1Sample = Wav1Sample
        List[i].FoundOffset = FoundOffset
        List[i].RangeGood = true;
        i = i +1;
        // Now we will search for other matches every CheckIncrement samples, but since this
        // may fail causing a goto Reset, we will preserve the existing Wav1Sample and
        // Wav2Sample values and use a second set of these values to search for these further
        // matches.
        Wav1Sample2 = Wav1Sample
        Wav2Sample2 = Wav2Sample
                                          // For Guide to Part matching, test for a match every 20 seconds for
                                          // up to 120 places. For Part to Part matching, test for a match every
        While( i < ListSize)              // 1024 samples for up to 8 places.
        {
                       // Advance to next position to test.
                       Wav1Sample2 = Wav1Sample2 + CheckIncrement
                       Wav2Sample2 = Wav1Sample2 + List[0]. FoundOffset – SampleDuration/2
                       CurrentWav2Sample = Wav2Sample2
                       MaxWav2Sample = Wav2Sample2 + SampleDuration
                       MaxRatio = 0.0
                       FoundWav2Sample = –1 // This will become the sample number where the best match
                                                   // is found.
                       FoundOffset = 0             // This will be the calculated offset to the sample
                                                   // FoundWav2Sample.
                       While( CurrentWav2Sample < MaxWav2Sample )
                       {
                              If( Process( Wav1 , Wav1Sample2, Wav2, CurrentWav2Sample, SampleDuration,
                                     SampDurPwr, Window, Return offset, Return RatioMaxToAverage ) )
                              {
                                     // Process returned true so assume that end of file was reached.
                                     Finished = true
                                     break // Exit the inner While loop.
                              }
                              If( RatioMaxToAverage > MaxRatio )
                              {      // This match is better than the previous ones.
                                     MaxRatio = RatioMaxToAverage
                                     FoundWav2Sample = CurrentWav2Sample – offset
                                     FoundOffset = FoundWav2Sample – Wav1Sample2
                              }
                              CurrentWav2Sample = CurrentWav2Sample + Wav2Increment // Advance
                       }
                       If( Finished ) break // If Finished is true then exit the While loop.
                       If( MaxRatio > MaxThreshold )
                       {      // There was a good measurement so save the measurement data in the list.
                              List[i].MaxRatio = MaxRatio
                              List[i].Wav1Sample = Wav1Sample2
                              List[i].FoundOffset = FoundOffset
                              List[i].RangeGood = true
                              i = i + 1
                       }
        } // Exiting the outer While loop.
        If( i equals 1 ) goto Reset               // Only the original measurement was above the MaxThreshold
                                                  // so this makes it very questionable. Go to Reset and try again.
        If( i equals 2 )
        {                     // Only one other match was found
                       Offset1 = List[0].FoundOffset
                       Offset2 = List[1].FoundOffset
                       If( Abs( ( Offset1 – Offset2 ) > 4000 ) )
                       {      // The Offset readings are more than 4000 samples apart
                              // so try again at a different position.
                              goto Reset
                       }
                       else
                       {      // Calculate the average offset
                              Wav1ToWav2Offset = ( Offset1 + Offset2 ) / 2
                              Return false // This signals success to the calling program.
```

```
        }
    }
    // Next the program will go through the List and discard the lowest 1/8 of the
    // List[i].FoundOffset
    // values and also will discard the highest 1/8 of the List[i].FoundOffset values. This is done
    // by looking for the highest and lowest values and setting List[i].RangeGood = false for
    // those that fall into the lowest 1/8 and highest 1/8 of the existing values.
    // This process marks as bad any outliers that can cause problems, but still retains the
    // central 75% of values. This is a straight forward process so it will not be shown here.
    // As part of this process the variable High will contain the highest remaining value of
    // List[i].FoundOffset, and the variable Low will contain the lowest remaining value of
    // List[i].FoundOffset. High and Low do not include the discarded readings.
    If( (High − Low) > 6000 )                             // High and Low per above explanation.
    {
                        // The variation in timing measurements indicates the measurements are inaccurate.
                        goto Reset
    }
    // At this point the remaining non-discarded values from List[i].FoundOffset will be averaged.
    // The average will be placed in Wav1ToWav2Offset. The averaging process is straight
    // forward and will not be shown.
    Wav1ToWav2Offset = // Return: Average per above explanation.
    // Return the sample number where audio would begin to fade to the next part.
    StartFadeToNext = List[1].Wav1Sample
    Return false // This signals success to the calling program.
}
```

Here are some typical measurement values for a three part movie.

TABLE 1

Audio Conform Measurement Data

| Name of variable | Part 1 | Part 2 | Part 3 |
|---|---|---|---|
| GuideToPartOffset | 4239901 | −112517393 | −230716300 |
| PartAudioStart | 4031632 | 2057142 | 1368206 |
| PartAudioEnd | 120512577 | 121077930 | 127800989 |
| OverlapDurationCurrentToNext | 1698141 | 1510817 | 0 |
| PreviousPartToPartOffset | 0 | −116758248 | −118198086 |
| PartStartFadeToNext | 120505601 | 121070954 | 0 |
| FadeToNextDuration | 4800 | 4800 | 0 |

Figure 10:
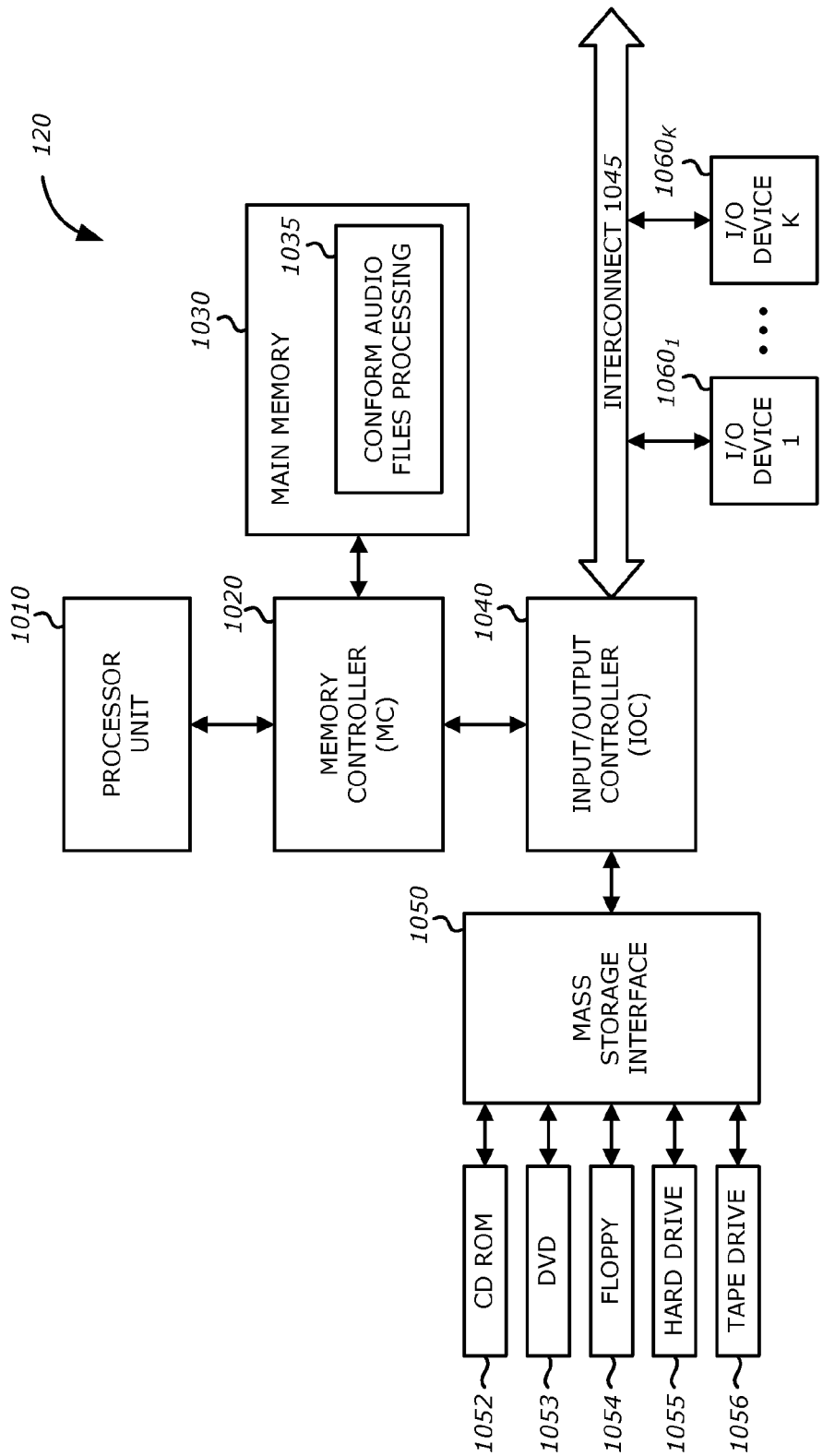
FIG. 10 is a diagram illustrating a processing system according to one embodiment.

FIG. 10 is a diagram illustrating a processing system 120 according to one embodiment. The processing system 120 includes a processor unit 1010, a memory controller (MC) 1020, a main memory 1030, an input/output controller (IOC) 1040, an interconnect 1045, a mass storage interface 1050, and input/output (I/O) devices $1060_1$ to $1060_K$. The processing system 120 may include more or less of the above components.

The processor unit 1010 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 1020 provides control and configuration of memory and input/output devices such as the main memory 1030 and the IOC 1040. The MC 1020 may be integrated into a chipset that integrates multiple functionalities such as graphics, media, host-to-peripheral bus interface, memory control, power management, etc.

The main memory 1030 stores system code and data. The main memory 1030 is typically implemented with dynamic random access memory (DRAM), static random access memory (SRAM), or any other types of memories including those that do not need to be refreshed. The main memory 1030 may include multiple channels of memory devices such as DRAMs. The main memory 1030 may contain the automated audio conform processing module 1035 that performs the functions of the automated audio conform files.

The IOC 1040 has a number of functionalities that are designed to support I/O functions. The IOC 1040 may also be integrated into a chipset together or separate from the MC 1020 to perform I/O functions. The IOC 1040 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 1045 provides interface to peripheral devices. The interconnect 1045 may be point-to-point or connected to multiple devices. For clarity, not all interconnects are shown. It is contemplated that the interconnect 1045 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 1050 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 1052, digital video/versatile disc (DVD) 1053, floppy drive 1054, hard drive 1055, tape drive 1056, and any other magnetic or optic storage devices. The mass storage device provides a mechanism to read machine-accessible media.

The I/O devices $1060_1$ to $1060_K$ may include any I/O devices to perform I/O functions. Examples of I/O devices $1060_1$ to $1060_K$ include controller for input devices (e.g., keyboard, mouse, trackball, pointing device), media card (e.g., audio, video, graphic), and any other peripheral controllers.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
  locating a guide start location in a guide segment of a guide track, the guide segment having a segment length;
  locating a part start location of a part corresponding to the guide start location;
  performing N phase correlations between N successively overlapped part segments of the part from the part start location and the guide segment from the guide start location within a first interval using Fast Fourier Transforms (FFTs), each of the N successively overlapped part segments having the segment length; and
  determining a best match from the N phase correlations using a match threshold, the best match providing a first offset.

2. The method of claim 1 further comprising:
  obtaining candidate offsets at pre-determined increments throughout the guide segment using the first offset; and
  filtering the first offset and the candidate offsets to obtain a guide-to-part offset.

3. The method of claim 2 further comprising:
  determining a part end location.

4. The method of claim 2 wherein obtaining the candidate offsets comprises:
  performing phase correlations between subsequent part segments and subsequent guide segments, the subsequent part segments and subsequent guide segments being located at the pre-determined increments; and
  selecting the candidate offsets using the match threshold.

5. The method of claim 2 wherein filtering the first offset and the candidate offsets comprises:
  discarding a plurality of low and high extremes of the first offset and the candidate offsets; and
  computing the guide-to-part offset as average of remaining offsets if the remaining offsets are within a pre-determined variation level.

6. The method of claim 3 wherein locating the start location in the guide segment comprises:
  if the guide segment is a first segment
    skipping a tone if present, and
    locating a first sample greater than a threshold level;

else if the guide segment is a subsequent segment
  subtracting the guide-to-part offset from the part end of location to provide a difference, and
  adding the difference with a time interval.

7. The method of claim 3 further comprising:
determining an overlap between a current part and a next part;
if the overlap is sufficient,
  determining a match between end of the current part and beginning of the next part,
  calculating a part-to-part offset,
  calculating a fade-in location, and
  calculating a fade duration.

8. The method of claim 7 wherein determining the match comprises:
performing a phase correlation between overlapped samples of the end of the current part and the beginning of the next part.

9. The method of claim 7 further comprising:
creating a conform file using the guide-to-part offset, the part start location, the part end location, the part-to-part offset, the fade-in location, and the fade duration.

10. The method of claim 9 wherein creating the conform file comprises:
copying the part located by the guide-to-part offset to the conform file until the fade-in location of the part is reached.

11. The method of claim 10 further comprising:
if the part-to-part offset is non-zero, locating start of the next part using the part-to-part offset,
else locating start of the next part using the guide-to-part offset of the next part;
performing a cross fade operation; and
copying the next part until the fade-in location of the next part is reached.

12. The method of claim 1 wherein the guide track is a reference audio track that matches a motion picture from start to finish.

13. The method of claim 1 wherein the part is an audio foreign language track associated with a motion picture.

14. An article of manufacture comprising:
a non-transitory machine-accessible medium including data that, when accessed by a machine, cause the machine to perform operations comprising:
  locating a guide start location in a guide segment of a guide track, the guide segment having a segment length;
  locating a part start location of a part corresponding to the guide start location;
  performing N phase correlations between N successively overlapped part segments of the part from the part start location and the guide segment from the guide start location within a first interval using Fast Fourier Transforms (FFTs), each of the N successively overlapped part segments having the segment length; and
  determining a best match from the N phase correlations using a match threshold, the best match providing a first offset.

15. The article of manufacture of claim 14 wherein the data further comprises data that, when accessed by a machine, cause the machine to perform operations comprising:
  obtaining candidate offsets at pre-determined increments throughout the guide segment using the first offset; and
  filtering the first offset and the candidate offsets to obtain a guide-to-part offset.

16. The article of manufacture of claim 15 wherein the data further comprises data that, when accessed by a machine, cause the machine to perform operations comprising:
  determining a part end location.

17. The article of manufacture of claim 15 wherein the data causing the machine to perform obtaining the candidate offsets comprise data that, when executed by the machine, causes the machine to perform operations comprising:
  performing phase correlations between subsequent part segments and subsequent guide segments, the subsequent part segments and subsequent guide segments being located at the pre-determined increments; and
  selecting the candidate offsets using the match threshold.

18. The article of manufacture of claim 15 wherein the data causing the machine to perform filtering the first offset and the candidate offsets comprise data that, when executed by the machine, causes the machine to perform operations comprising:
  discarding a plurality of low and high extremes of the first offset and the candidate offsets; and
  computing the guide-to-part offset as average of remaining offsets if the remaining offsets are within a pre-determined variation level.

19. The article of manufacture of claim 16 wherein the data causing the machine to perform locating the start location in the guide segment comprise data that, when executed by the machine, causes the machine to perform operations comprising:
  if the guide segment is a first segment
    skipping a tone if present, and
    locating a first sample greater than a threshold level;
  else if the guide segment is a subsequent segment
    subtracting the guide-to-part offset from the part end of location to provide a difference, and
    adding the difference with a time interval.

* * * * *